United States Patent
Hiroi et al.

(10) Patent No.: US 11,257,224 B2
(45) Date of Patent: Feb. 22, 2022

(54) OBJECT TRACKER, OBJECT TRACKING METHOD, AND COMPUTER PROGRAM

(71) Applicant: Nippon Telegraph and Telephone Corporation, Tokyo (JP)

(72) Inventors: Yuichi Hiroi, Musashino (JP); Yoko Ishii, Musashino (JP); Tetsuro Tokunaga, Musashino (JP); Yoshihide Tonomura, Musashino (JP); Kota Hidaka, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/978,360

(22) PCT Filed: Mar. 4, 2019

(86) PCT No.: PCT/JP2019/008342
§ 371 (c)(1),
(2) Date: Sep. 4, 2020

(87) PCT Pub. No.: WO2019/172172
PCT Pub. Date: Sep. 12, 2019

(65) Prior Publication Data
US 2021/0042935 A1  Feb. 11, 2021

(30) Foreign Application Priority Data
Mar. 5, 2018 (JP) .............................. JP2018-038232

(51) Int. Cl.
*G06K 9/00* (2006.01)
*G06T 7/246* (2017.01)

(52) U.S. Cl.
CPC .... *G06T 7/246* (2017.01); *G06T 2207/10016* (2013.01); *G06T 2207/20072* (2013.01); *G06T 2207/20081* (2013.01)

(58) Field of Classification Search
CPC .......... G06T 7/246; G06T 2207/10016; G06T 2207/20072; G06T 2207/20081
USPC ........................................................ 382/103
See application file for complete search history.

(56) References Cited

PUBLICATIONS

Akok, B., et al. "Robust object tracking by interleaving variable rate color particle filtering and deep learning." 2017 IEEE International Conference on Image Processing (ICIP). IEEE, 2017. (Year: 2017).*

(Continued)

*Primary Examiner* — Jonathan S Lee
(74) *Attorney, Agent, or Firm* — Fish & Richardson P.C.

(57) ABSTRACT

There is provided an object tracking apparatus that realizes robust object detection and tracking even for movement fluctuation and observation noise, an object tracking method and a computer program. An object cracking apparatus 1 is an apparatus tracking an object in video, the object tracking apparatus 1 including: a deep learning discriminator 2 which is a discriminator by deep learning; and a particle filter function unit 3 tracking an object by applying a multi-channel feature value of video including feature values by the deep learning discriminator 2 to likelihood evaluation by a particle filter, according to a distance between position information about the multi-channel feature value and position information about each particle.

13 Claims, 8 Drawing Sheets

(56) References Cited

PUBLICATIONS

Akai, Naoki, Luis Yoichi Morales, and Hiroshi Murase. "Simultaneous pose and reliability estimation using convolutional neural network and Rao-Blackwellized particle filter." Advanced Robotics 32.17 (2018): 930-944. (Year: 2018).*

Pjreddie.com, [online], "YOLO: Real-Time Object Detection," 2018, retrieved on July 3. 2020, retrieved from URL<https://pjreddie.com/darknet/yolo/>, 10 pages.

* cited by examiner

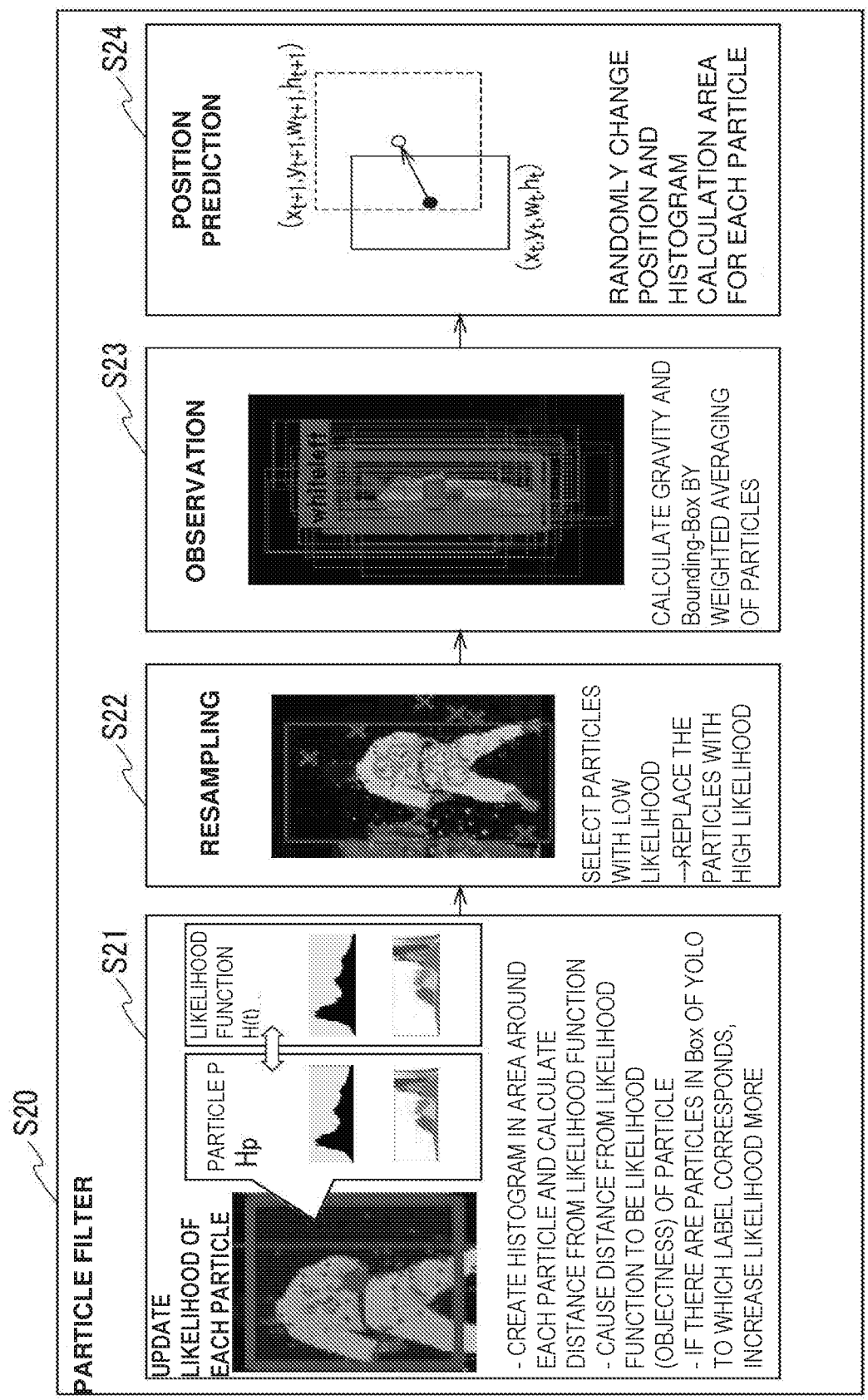

OBJECT TRACKER, OBJECT TRACKING METHOD, AND COMPUTER PROGRAM

CROSS-REFERENCE TO RELATED APPLICATIONS

This application is a National Stage application under 35 U.S.C. § 371 of International Application No. PCT/JP2019/008342, having an International Filing Date of Mar. 4, 2019, which claims priority to Japanese Application Serial No. 2018-038232, filed on Mar. 5, 2018. The disclosure of the prior application is considered part of the disclosure of this application, and is incorporated in its entirety into this application.

TECHNICAL FIELD

The present invention relates to an object tracking apparatus tracking an object in video, an object tracking method and a computer program.

BACKGROUND ART

Conventionally, as a technique for tracking as object in video shot by a single RGB camera, there has been a technique using a discriminator by deep learning (see, for example, Non-Patent Literature 1). In a method by a deep learning discriminator, a class label indicating a classification of as object and a rectangular area (a center position x,y and a rectangle w,h of the object) indicating an object in an image are outputted by inputting a single image into the deep learning discriminator. In the deep learning discriminator, the object area in the image is detected by high-speed processing of about 20 mm sec per image. This enables real-time object detection and tracking for video. For example, for objects in video shot by a single RGB camera, it is possible to detect categories of objects such as "player" and "ball" and track the objects.

CITATION LIST

Non-Patent Literature

Non-Patent Literature 1: "YOLO: Real-Time Object Detection", [retrieved on Feb. 14, 2019], the Internet <URL: https://pjreddie.com/darknet/yolo/>

SUMMARY OF THE INVENTION

Technical Problem

In the object detection and object tracking method by the deep learning discriminator described above, an object detection/tracking process is performed for each of frames constituting video. Therefore, object tracking in consideration of time series in video is not performed. As a result, a problem of not being robust for video in which shapes and movements of objects drastically change like sports video and video in which objects are drastically occluded.

An object of the present invention is to provide an object tracking apparatus that realizes object detection and tracking that is robust even for movement fluctuation and observation noise, an object tracking method and a computer program.

Means for Solving the Problem

In order to achieve the above object, a main point of an invention according to a first aspect is an object tracking apparatus tracking an object in video, including: a deep learning discriminator which is a discriminator by deep learning; and a particle filter function unit tracking the object by applying a multi-channel feature value of video including feature values by the deep learning discriminator to likelihood evaluation by a particle filter, according to a distance between position information about the multi-channel feature value and position information about each particle.

A main point of an invention according to a second aspect is that, in the invention according to the first aspect, the particle filter function unit dynamically changes weighting of likelihood of each particle according to a state of a scene, based on the multi-channel feature value.

A main point of an invention according to a third aspect is that, in the invention according to the first or second aspect, the particle filter function unit creates, for each object, a feature value histogram for the tracked object at time t by extracting only particles having a label corresponding to a label of a rectangle of the object detected by the deep learning discriminator and existing in the rectangle, extracting pixel areas around the particles and calculating feature values for the pixel areas, and obtains a likelihood function for the tracked object at the time t by determining a weighted sum of a histogram at time t−1 and the histogram at the time t.

A main point of an invention according to a fourth aspect is that, in the invention according to the third aspect, when a certain particle exists in the rectangle detected by the deep learning discriminator, the particle filter function unit updates likelihood of the particle by the following formula, when reliability of the rectangle detected by the deep learning discriminator is indicated by p, a distance from a rectangle center to four corners is indicated by R, a distance to the particle is indicated by r, the likelihood of the particle at the time t is indicated by $\pi_t$, and a parameter to determine a contribution rate of the deep learning discriminator is indicated by β.

$$\pi_t \leftarrow \pi_t(1 + p\lambda_t)^\beta \quad \text{[Formula 1]}$$

$$\lambda_t = \max\left\{0, 1 - \frac{r^2}{R^2}\right\} \quad \text{[Formula 2]}$$

A main point of an invention according to a fifth aspect is that, in the invention according to the fourth aspect, the particle filter function unit evaluates the particle as "having more objectness" as the reliability p of a detection result of the deep learning discriminator is higher, and a position of the particle is closer to the rectangle center.

A main point of an invention according to a sixth aspect is that, in the invention according to any of the first to fifth aspects, a sensor unit is further provided; and the particle filter function unit combines sensor data from the sensor unit with the likelihood evaluation by the particle filter, in addition to the object detection result by the deep learning discriminator.

A main point of an invention according to a seventh aspect is an object tracking method for tracking the object in video, wherein an object tracking apparatus tracking the object in the video executes: a detection step of a deep learning discriminator, which is a discriminator by deep learning, detecting the object; and a tracking step of tracking the object by applying an object detection result by the deep learning discriminator to likelihood evaluation of a particle filter.

A main point of an invention according to an eighth aspect is a computer program causing a computer to function as each of the function units according to any of the first to sixth aspects.

Effects of the Invention

According to the present invention, it is possible to provide an object tracking apparatus that realizes object detection and tracking that is robust even for movement fluctuation and observation noise, an object tracking method and a computer program.

BRIEF DESCRIPTION OF DRAWINGS

FIG. 11 is a diagram showing details of a particle filter in the embodiment of the present invention.

DESCRIPTION OF EMBODIMENT

An embodiment of the present invention will be described below in detail with reference to drawings. Note that the embodiment below shows an example of an object tracking apparatus for embodying a technical idea of this invention, and an apparatus configuration, a data configuration and the like are not limited to the embodiment below.

SUMMARY

Figure 1:
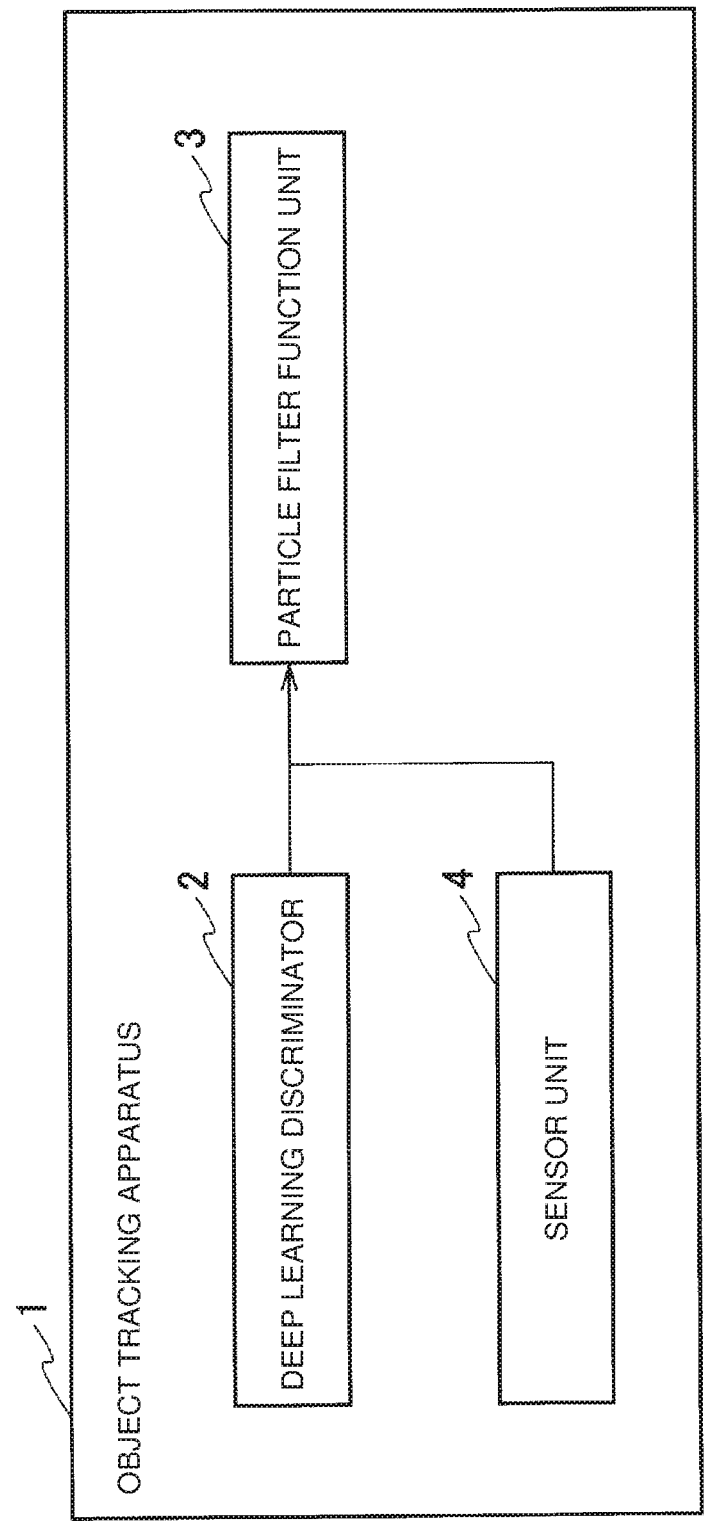
FIG. 1 is a schematic functional block diagram of an object tracking apparatus in an embodiment of the present invention.

FIG. 1 is a schematic functional block diagram of an object tracking apparatus 1 in the embodiment of the present invention. This object tracking apparatus 1 is an apparatus that realizes object detection and tracking by integration of a particle filter and a deep learning discriminator 2, and is provided with the deep learning discriminator 2 and a particle filter function unit 3 as shown in FIG. 1.

The deep learning discriminator 2 is a discriminator by deep learning. The technique of Non-Patent Literature 1 (YOLO) can be used for the deep learning discriminator 2. The YOLO (You Only Look Once) is a method in which an object rectangle and an object category are outputted for each of local areas divided in a 7×7 grid.

The particle filter function unit 3 performs object tracking using the particle filter. The particle filter is a complicated model estimation method based on simulation. Specifically, the particle filter function unit 3 tracks an object by applying an object detection result by the deep learning discriminator 2 to likelihood evaluation by the particle filter. By adding information about an object area detected by the deep learning discriminator 2 to a particle as a weighted sum, detection of a general object is robustly performed as time-series data. As a result, it becomes possible to perform object detection and tracking at the same time even for video in which objects drastically move and are drastically occluded such as sports video.

Furthermore, the object tracking apparatus 1 may be provided with a sensor unit 4 such as a depth sensor according to an environment. In this case, the particle filter function unit 3 combines sensor data from the sensor unit 4 with the likelihood evaluation by the particle filter, in addition to an object detection result by the deep learning discriminator 2. Thereby, it becomes possible to, while capturing evaluation suitable for an environment, robustly perform both of object detection and tracking.

Note that FIG. 1 shows only a main portion of the object tracking apparatus 1. The object tracking apparatus 1 may be provided with a video camera, a storage device, a display device, a communication device and the like.

<Flow of Process>

Figure 2:
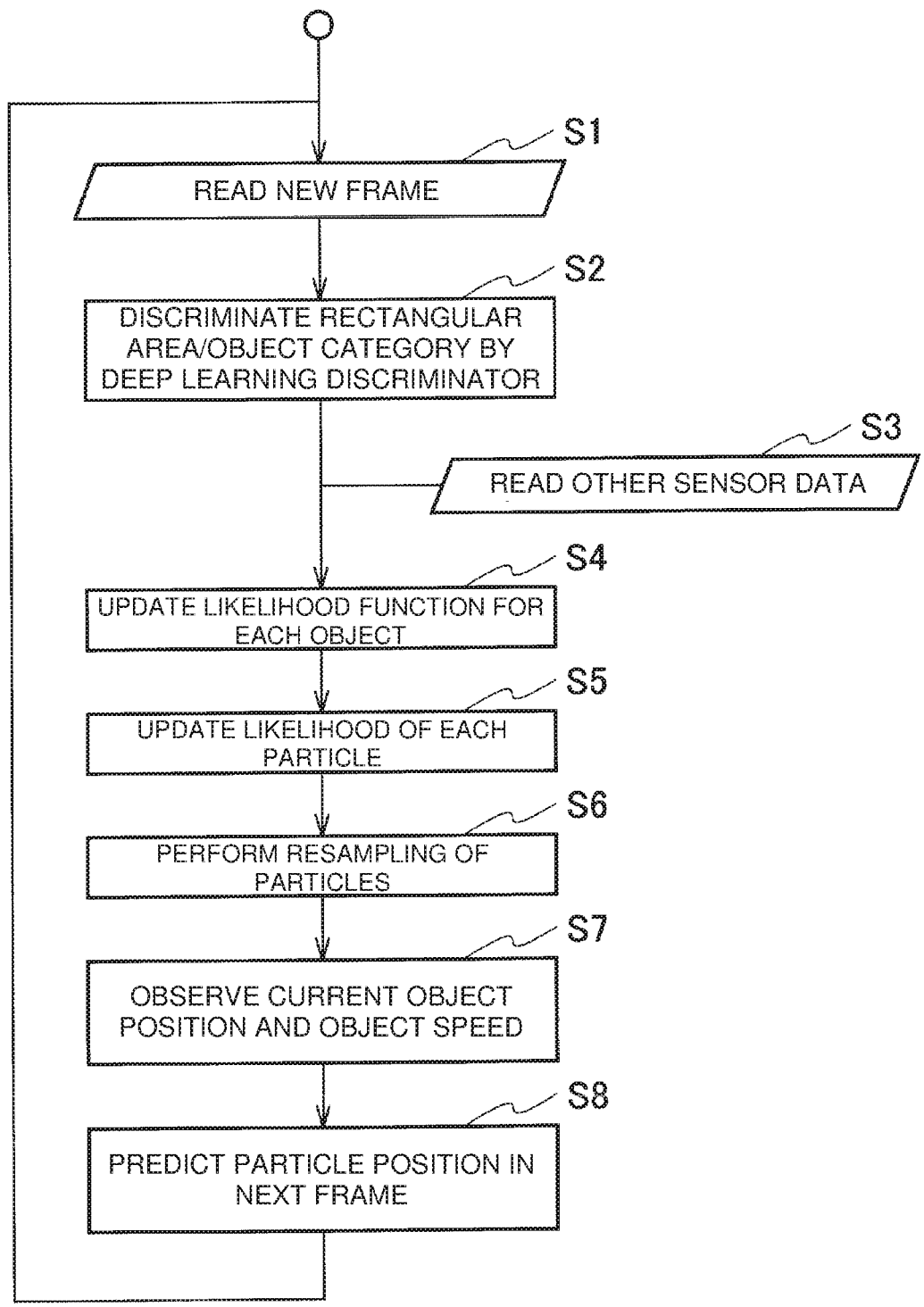
FIG. 2 is a flowchart showing a flow of a process performed by the object tracking apparatus in the embodiment of the present invention.

FIG. 2 is a flowchart showing a flow of a process performed by the object tracking apparatus 1 in the embodiment of the present invention. Hereinafter, a configuration of the object tracking apparatus 1 will be described together with the flow of the process, using FIG. 2.

After being started up, the object tracking apparatus 1 captures each frame video from the video camera (S1).

Next, by inputting each captured image to the deep learning discriminator 2, rectangular areas indicating objects in each image and object categories (labels) are discriminated (S2). The technique of Non-Patent Literature 1 is used for the deep learning discriminator 2.

Next, other sensor data of a depth sensor and the like are arbitrarily inputted according to an environment, in addition to information about the rectangular areas and object categories described above (53), and a likelihood function for the particle filter indicating each object is updated (S4).

Next, likelihood of each particle is updated based on the updated likelihood function (S5). The likelihood indicates objectness. A particle with a higher likelihood indicates that pixels around the particle are close to pixels indicated by a target object.

Next, resampling of particles is performed based on the updated likelihoods (S6). Here, based on a random threshold, particles with a low likelihood are selected and replaced with particles with a high likelihood.

Next, by performing weighted averaging of positions of the particles according to the likelihoods, a present object position is observed (S7). Further, by determining a positional difference from a previous frame, a current object speed is observed (S7).

Next, a position of each particle is updated according to the current object speed (S8). Here, a predetermined threshold is set for the object speed. If an absolute value of the object speed is equal to or below the threshold, the particle positions are randomly moved within a concentric circle range with the current position as a center. If the absolute value of the object speed is above the threshold, the particle positions are moved based on the speed vector as a reference.

The above process is repeated. Thereby, for each frame, a gravity position, an object area and label information for each object tracked by particles are outputted.

<Generation of Particle>

If the following condition is satisfied when an object is detected by the deep learning discriminator 2, it is considered that a new object has been detected, and a new particle group indicating the object is generated in a center of a rectangle detected by the deep learning discriminator 2.

Condition: For all objects tracked by the particle filter in a previous frame, an object area does not overlap with any rectangles detected by the deep learning discriminator 2 in the current frame.

<Disappearance of Particle>

If both of the following conditions 1 and 2 are satisfied for an object tracked by the particle filter, it is considered that the tracked object has disappeared.

Condition 1: If, when an indicator about likelihood functions and a center-to-center distance is calculated for two tracked objects having the same label, the indicator is equal to or below a set threshold, it is considered that both are tracking the same object, and particles of one object are caused to disappear.

Condition 2: Time (the number of frames) during which an area of a tracked object by particles does not overlap a rectangle detected by the deep learning discriminator 2 is counted. If the counted number exceeds a set threshold, it is considered that the target object has disappeared, and the particles are caused to disappear.

<Method for Updating Likelihood Function for Each Object>

Figure 3:
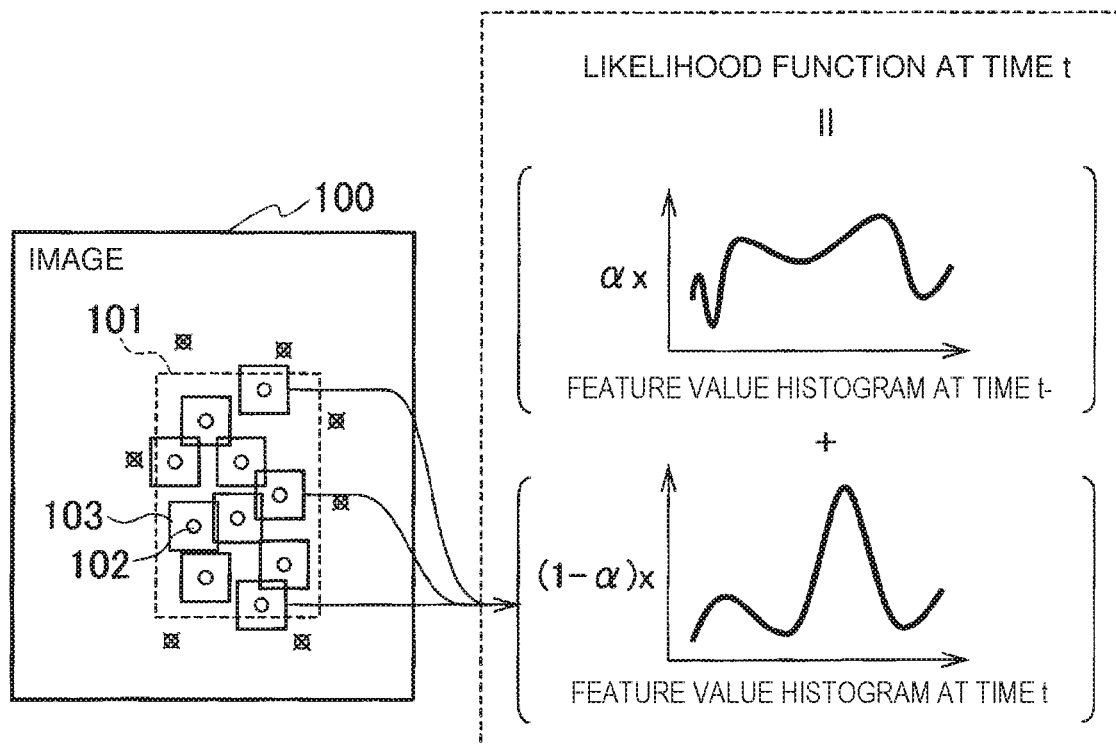
FIG. 3 is a diagram showing a method for updating a likelihood function for each object in the embodiment of the present invention.

FIG. 3 is a diagram showing a method for updating e likelihood function for each object in the embodiment of the present invention. First, for each object in an image 100, only particles 102 having a label corresponding to a label of a rectangle 101 of an object detected by the deep learning discriminator 2 and existing in the rectangle 101 are extracted. After that, by extracting pixel areas 103 around the particles 102 and calculating feature values of color, outline and the like (a multi-channel feature value) for the pixel areas 103, a feature value histogram of the tracked object at time t is created. By determining a weighted sum of a histogram at time t−1 and the histogram at the time t, the weighted sum is set as a likelihood function for the tracked object at the time t. Here, a weight α in FIG. 3 is a parameter that a user can specify.

According to the embodiment of the present invention, it is possible to track an object using a multi-channel feature value. The multi-channel feature value will be described later in detail.

<Method for Updating Likelihood of Each Particle>

Figure 4:
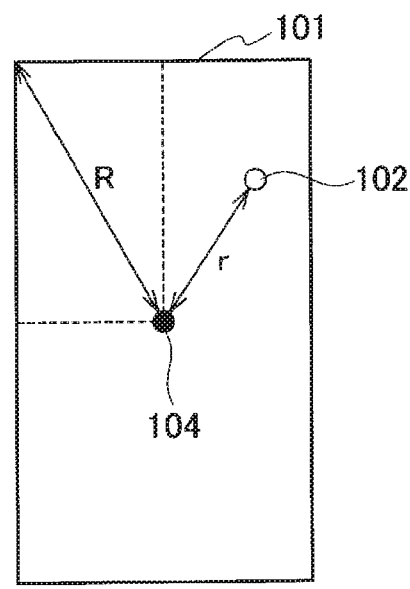
FIG. 4 is a diagram showing a method for calculating likelihood of each particle in the embodiment of the present invention.

FIG. 4 is a diagram showing a method for calculating likelihood of each particle in the embodiment of the present invention. A case where a certain particle 102 exists in a rectangle 101 detected by the deep learning discriminator 2 will be considered. When, reliability of the rectangle 101 detected by the deep learning discriminator 2 is indicated by p, a distance from a rectangle center 104 to four corners is indicated by R, a distance to the particle 102 is indicated by r, and likelihood of the particle 102 at the time t is indicated by $\pi_t$, the likelihood of the particle 102 is updated by the following formulas.

$$\pi_t \leftarrow \pi_t(1 + p\lambda_t)^\beta \quad \text{[Formula 1]}$$

$$\lambda_t = \max\left\{0, 1 - \frac{r^2}{R^2}\right\} \quad \text{[Formula 2]}$$

Here, β is a parameter that the user can specify, the parameter β determining a contribution rate of the deep learning discriminator 2.

The above formulas show that, as the reliability p of a detection result of the deep learning discriminator 2 is higher, and a position of the particle 102 is closer to the rectangle center 104, the particle 102 is evaluated as "having more objectness". Thereby, it is expected that deep learning discrimination supplements the object tracking performance of the particle filter.

As described above, in the object tracking apparatus 1 in the embodiment of the present invention, by applying a result of the deep learning discriminator 2 to likelihood evaluation by a state transition model, which is called a particle filter, in order to solve the conventional problem, it becomes possible to realize robust object detection and tracking even for movement fluctuation and observation noise. It has been confirmed that, according to this method, it is possible to perform object detection and tracking at the same time while reducing misdetection of an object category and the number of objects.

Further, by combining values of various sensors such as a depth sensor, in addition to the deep learning discriminator 2, to the likelihood evaluation by the particle filter according to an environment, it becomes possible to robustly perform both of object detection and tracking while capturing evaluation suitable for the environment. It has been confirmed that, according to this method, it is possible to perform object detection and tracking at the same time while further reducing misdetection of an object category and the number of objects.

<Multi-Cchannel Feature Value>

In general, a multi-channel feature value is "a feature value that has a larger amount of information than a single feature by combining a plurality of pieces of information about features of brightness and color that an image itself has". In object tracking, in a case where a plurality of features that an image itself has are combined, such as a case of "performing tracking using information about object color+outline+depth+deep learning result", an amount of information about the object increases according to the combination, and it is possible to perform more accurate tracking. The information in this case is "multi-channel information". On the other hand, in the case of "performing tracking using only information about color of an object", "performing tracking using only information about an outline of an object" or "performing tracking using only information about depth of an object", tracking is performed using only a single piece of information, and all of the above pieces of information correspond to "single-channel information".

In the embodiment of the present invention, calculations of a likelihood function for the particle filter and likelihood are multi-channel information. For example, as for the above description of "by . . . calculating feature values of color, outline and the like for the pixel areas 103, a feature value histogram of the tracked object at time t is created", two-channel likelihood is reflected on particles by the plurality of feature values of "color+outline" being integrated into one histogram. Furthermore, as for the above description of "applying a result of the deep learning discriminator 2 to likelihood evaluation by a state transition model, which is called a particle filter", "features of deep learning" is combined with the "color+outline" described above, and particles have an amount of three-channel information.

In the embodiment of the present invention, there is room for, by further adding "depth" and information of other sensors (for example, "sound", "target temperature" and the like) in addition to the above three-channel information, an amount of four-channel or more information can be added to particles, as shown in the subsequent description of "by combining values of various sensors such as a depth sensor, in addition to the deep learning discriminator 2, to the likelihood evaluation by the particle filter according to an environment, it becomes possible to robustly perform both of object detection and tracking while capturing evaluation suitable for the environment". Thus, according to the embodiment of the present invention, information that particles have is multi-channel information, and it becomes possible to, by causing the particles to have information about a plurality of features, perform more robust object tracking.

<Comparison with Result by Single YOLO>

Figure 5:
FIG. 5 is a diagram showing comparison with a result by a single YOLO (at the time of failure in YOLO tracking).
Figure 6:
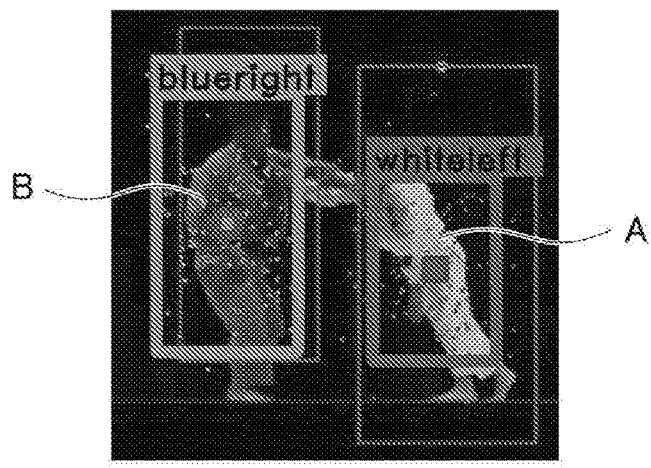
FIG. 6 is a diagram showing comparison with a result by a single YOLO (at the time of YOLO misdetection).
Figure 7:
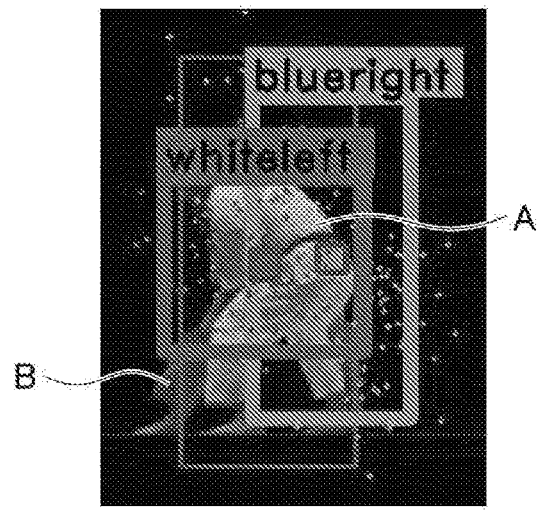
FIG. 7 is a diagram showing comparison with a result by a single YOLO (at the time of occurrence of occlusion).

FIGS. 5 to 7 are diagrams showing comparison with results by a single YOLO. Here, video in which a player in a white judo uniform and a player B in a blue judo uniform are fighting is shown as an example. A thin line indicates a result by the single YOLO, and a thick line indicates a result by the embodiment of the present invention (YOLO+particle filter).

FIG. 5 shows failure in tracking by the YOLO. As shown in FIG. 5, according to the embodiment of the present invention, it is possible to track the player B in the blue judo uniform who is not detected by the YOLO.

FIG. 6 shows misdetection by the YOLO. As shown in FIG. 6, according to the embodiment of the present invention, it is possible to correctly determine the player B in the blue judo uniform which is misdetected to be white by the YOLO.

FIG. 7 shows occurrence of occlusion. As shown in FIG. 7, according to the embodiment of the present invention, it is possible to estimate a position of the player B in the blue judo uniform who cannot be seen from a camera. As described above, in the object tracking apparatus 1 according to the embodiment of the present invention, the particle filter is introduced in order to more robustly extract a person position from video information and LiDAR information. Therefore, it is possible to continue object tracking at the time of failure in tracking or misdetection of labeling by the YOLO. Further, it is also possible to continue object tracking even at the time of occurrence of occlusion of a person. Furthermore, it is possible to more accurately identify a gravity position of a person in comparison with Bounding-Box of the YOLO.

<Incorporated Position of Particle Filter Function Unit>

Figure 8:
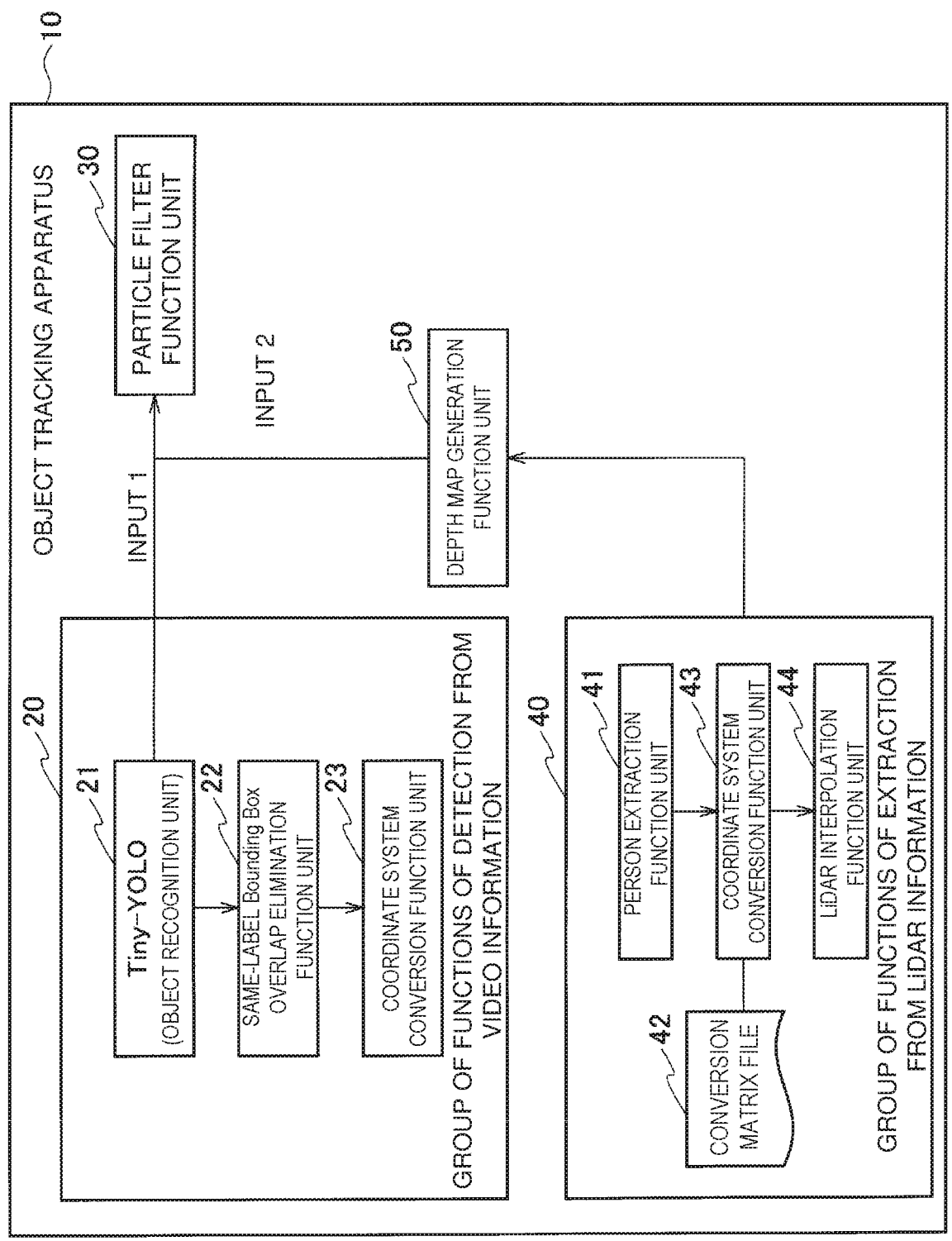
FIG. 8 is a detailed functional block diagram of an object tracking apparatus in the embodiment of the present invention.

FIG. 8 is a detailed functional block diagram of an object tracking apparatus 10 in the embodiment of the present invention. As shown in FIG. 8, a particle filter function unit 30 is incorporated subsequent to a group of functions of detection from video information 20 and a group of functions of extraction from LiDAR information 40.

The group of functions of detection from video information 20 is a group of functions of detecting a person position from video information and is provided with a Tiny-YOLO (an object recognition unit) 21, a same-label Bounding Box overlap elimination function unit 22 and a coordinate system conversion function unit 23. The group of functions of extraction from LiDAR information 40 is a group of functions of extracting a person position from LiDAR information and is provided with a person extraction function unit 41, a conversion matrix file 42, a coordinate system conversion function unit 43, a LiDAR interpolation function unit 44. A depth map generation function unit 50 generates a depth map based on an extraction result of the group of functions of extraction from LiDAR information 40.

As a result, to the particle filter function unit 30, Bounding Box & label information is inputted from the group of functions of detection from video information 20 (an input 1), and a depth map is inputted from the depth map generation function unit 50 (an input 2). Further, a gravity position of each object and Bounding Box & label information are outputted from the particle filter function unit 30.

<Particle Filter Function Unit: Flow of Process>

Figure 9:
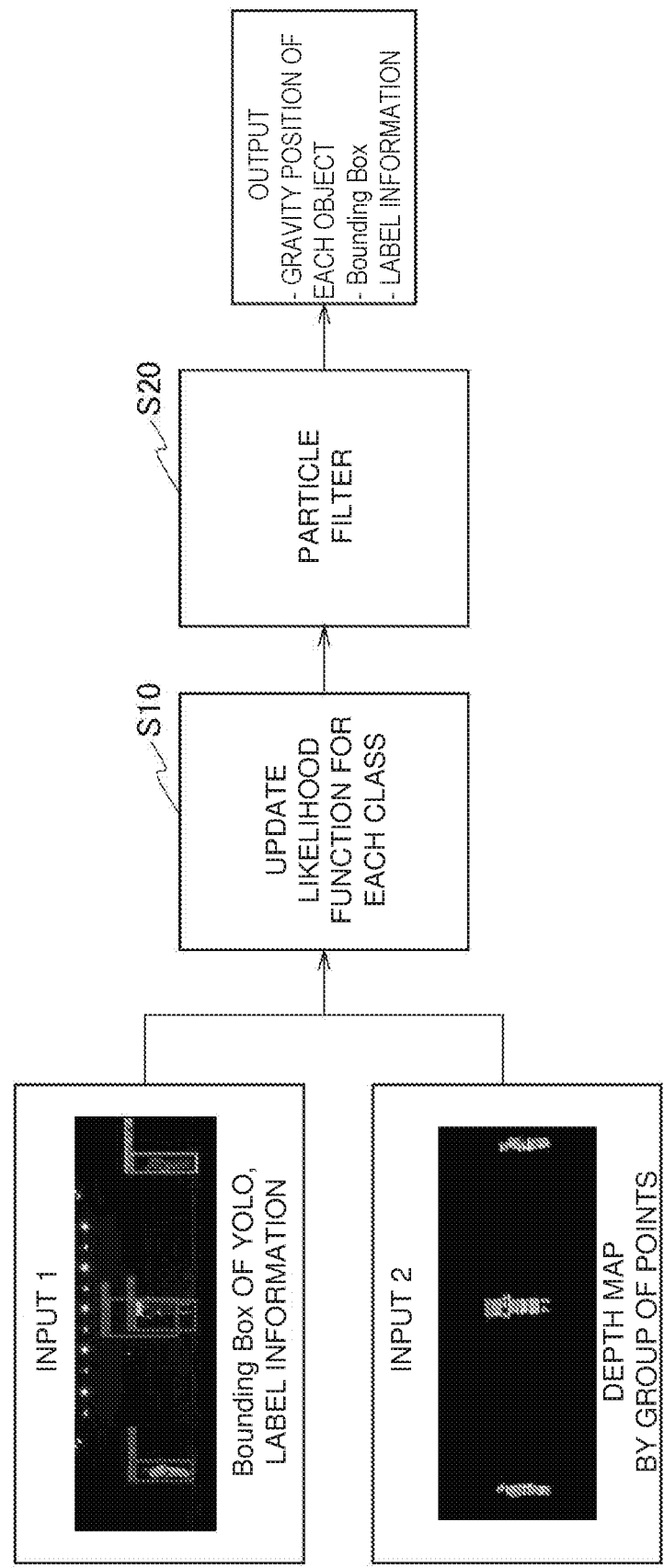
FIG. 9 is a diagram showing a flow of a process performed by a particle filter function unit in the embodiment of the present invention.

FIG. 9 is a diagram showing a flow of a process performed by the particle filter function unit 30 in the embodiment of the present invention. As shown in FIG. 9, when Bounding Box & label information and a depth map are inputted, the particle filter function unit 30 updates a likelihood function for each class (S10), performs object detection and tracking using the particle filter (S20) and outputs a gravity position of each object and the Bounding Box & label information.

Figure 10:
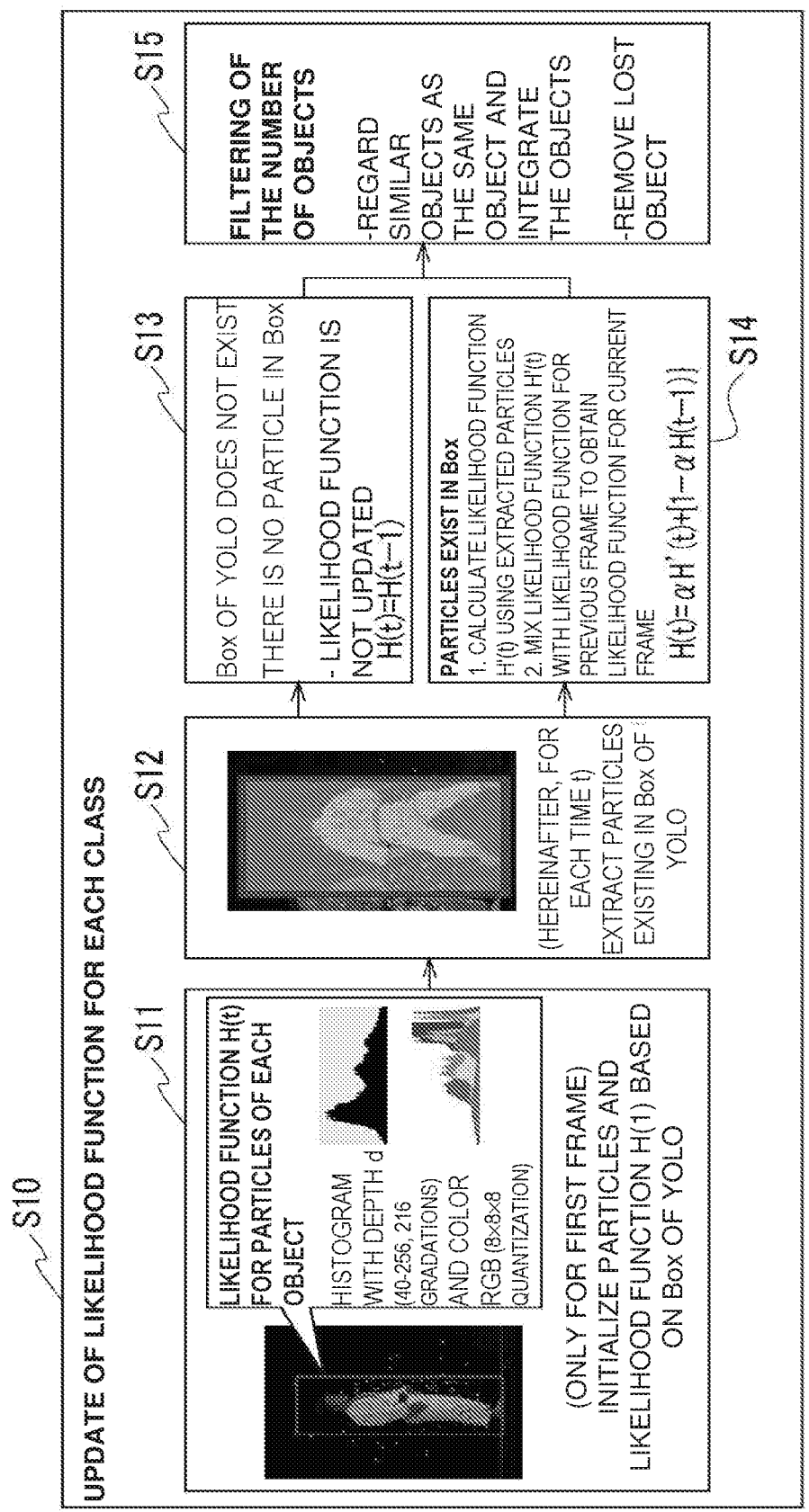
FIG. 10 is a diagram showing details of update of a likelihood function for each class in the embodiment of the present invention.

FIG. 10 is a diagram showing details of the update of the likelihood function for each class (S10). As shown in FIG. 10, only for the first frame, particles and a likelihood function H(1) are initialized based on Box of the YOLO (S11). After that, particles existing in Box of the YOLO are extracted at each time (S12) Here, if Box of the YOLO does not exist, or there is no particle in Box (S13), the likelihood function is not updated (H(t)=H(t−1)). On the other hand, if particles exist in Box (S14), a likelihood function H'(t) is calculated using the extracted particles, mixed with a likelihood function for a previous frame to obtain a likelihood function for the current frame (H(f)=αH'(t)+{1−αH(t−1)}). Lastly, filtering of the number of objects is performed (S15). In this filtering, similar objects are regarded as the same object and integrated, and lost objects are removed.

FIG. 11 is a diagram showing details of the particle filter (S20). As shown in FIG. 11, likelihood of each particle is updated first (S21). Specifically, a histogram is created in an area around each particle, and a distance from a likelihood function is calculated. The distance from the likelihood function is assumed to the likelihood (objectness) of the particle. Furthermore, if particles are included in Box of the YOLO to which a label corresponds, the likelihood is further increased. Next, resampling is performed (S22). Specifically, particles with a low likelihood are selected (replaced with particles with a high likelihood). Then, observation is performed (S23). Specifically, a gravity and Bounding-Box are calculated by weighted averaging of particles. Lastly, position prediction is performed (S24). Specifically, a position and a histogram calculation area for each particle are randomly changed.

<Conclusion>

As described above, the object tracking apparatus 1 of the embodiment of the present invention is an apparatus tracking an object in video and is provided with: a deep learning discriminator 2 which is a discriminator by deep learning; and a particle filter function unit 3 cracking the object by applying a multi-channel feature value of video including feature values by the deep learning discriminator 2 to likelihood evaluation by a particle filter, according to a distance between position information about the multi-channel feature value and position information about each particle. Thereby, it is possible to perform object tracking in consideration of time series in video, and, as a result, it becomes possible to realize object detection and tracking that are robust even for movement fluctuation and observation noise.

Specifically, the object tracking apparatus 1 is provided with the following features (a), (b) and (c).

First, (a) feature values by a deep learning discriminator are used. In other words, not only an object detection result (a label and a rectangular area) but also all feature values obtained using deep learning, including a result obtained from an intermediate layer of the deep learning and the like, are handled.

Further, (b) a multi-channel feature value that is a combination of feature values of the deep learning and other feature values is used. In other words, there is provided an object tracking function capable of integrally handling not only information of deep learning but also various kinds of feature values that are overlaid on video, such as information about color and outline, and depth information by a depth sensor.

Furthermore, (c) a restriction of "reflecting a distance relationship between a particle and positional information of deep learning on likelihood" exists. In other words, it can be said how to combine deep learning and a particle filter is specified.

Here, the particle filter function unit 3 may dynamically change weighting of likelihood of each particle according to a state of a scene, based on a multi-channel feature value. In other words, the user himself who uses the system can dynamically change a rate of contribution of each channel to the multi-channel feature value.

As described above, the object tracking function capable of integrally handling multi-channel feature values including deep learning is provided, and the multi-channel feature values are weighted and integrated. Weighting of the multi-channel feature values is automatically realized by update of a likelihood function in the particle filter and likelihood, and resampling.

Further, the particle filter function unit 3 may obtain a likelihood function for a tracking function for a tracked object at the time t by the following steps (1) to (3).

(1) For each object, only particles having a label corresponding to a label of a rectangle of the object detected by the deep learning discriminator 2 and existing in the rectangle are extracted.

(2) By extracting pixel areas around the particles and calculating feature values for the pixel areas, a feature value histogram for the tracked object at the time t is created.

(3) A weighted sum of a histogram at time t−1 and the histogram at the time t is determined.

Thereby, it is possible to update of a likelihood function for each object using an object detection result by the deep learning discriminator 2.

Further, when a certain particle exists in a rectangle detected by the deep learning discriminator 2, the particle filter function unit 3 may update likelihood of the particle by the following formula, when reliability of the rectangle detected by the deep learning discriminator 2 is indicated by p, a distance from a rectangle center to four corners is indicated by R, a distance to the particle is indicated by r, the likelihood of the particle at the time t is indicated by $\pi_t$, and a parameter to determine a contribution rate of the deep learning discriminator 2 is indicated by β. Thereby, it is possible to update of likelihood of each particle using an object detection result by the deep learning discriminator 2.

$$\pi_t \leftarrow \pi_t(1 + p\lambda_t)^\beta \quad \text{[Formula 1]}$$

$$\lambda_t = \max\left\{0, 1 - \frac{r^2}{R^2}\right\} \quad \text{[Formula 2]}$$

Further, the particle filter function unit 3 may evaluate that the particle "has more objectness" as the reliability p of a detection result of the deep learning discriminator 2 is higher, and a position of the particle is closer to the rectangle center. Thereby, it is expected that deep learning discrimination supplements the object tracking performance of the particle filter.

Furthermore, the sensor unit. 4 is provided, and the particle filter function unit 3 may combine sensor data from the sensor unit 4 with likelihood evaluation by the particle filter, in addition to the object detection result by the deep learning discriminator 2. Thereby, it becomes possible to, while capturing evaluation suitable for an environment, robustly perform both of object detection and tracking.

As described above, in the conventional technique, when there are a plurality of objects, tracking fails if one object is drastically occluded or drastically moves. According to the embodiment of the present invention, by estimating an object position based on likelihood by a particle filter, for data of a plurality of image frames, it is possible to improve accuracy of tracking.

Note that the present invention can be not only realized as the object tracking apparatus 1 but also realized as an object tracking method in which the characteristics function units that the object tracking apparatus 1 is provided with are steps or realized as a computer program for causing a computer to function as the characteristic function units that the object tracking apparatus 1 is provided with. It goes without saying that such a computer program can be distributed via a recording medium such as a OD-ROM or a transmission medium such as the Internet.

REFERENCE SIGNS LIST

1 object tracking apparatus
2 deep learning discriminator
3 particle filter function unit
4 sensor unit
10 object tracking apparatus
20 group of functions of detection from video information
30 particle filter function unit
40 group of functions of extraction from LiDAR information
50 depth map generation function unit

The invention claimed is:

1. An object tracking apparatus tracking an object in video, comprising:
   a deep learning discriminator that is implemented in one or more coputers and that is a discriminator by deep learning; and
   a particle filter function unit that is implemented in one or more computers and that is configured to track the object by applying a multi-channel feature value of video including feature values to the deep learning discriminator for likelihood evaluation using a particle filter, according to a distance between position information about the multi-channel feature value and position information about each particle.

2. The object tracking apparatus according to claim 1, wherein the particle filter function unit is configured to dynamically change weighting of likelihood of each particle according to a state of a scene, based on the multi-channel feature value.

3. The object tracking apparatus according to claim 1, wherein the particle filter function unit is configured to create, for each object, a feature value histogram for the tracked object at time t by (i) extracting only particles having a label corresponding to a label of a rectangle of the object detected by the deep learning discriminator and existing in the rectangle, (ii) extracting pixel areas around the particles, and (iii) calculating feature values for the pixel areas, and obtain a likelihood function for the tracked object at the time t by determining a weighted sum of a histogram at time t−1 and the histogram at the time t.

4. The object tracking apparatus according to claim 3, wherein, based on a certain particle existing in the rectangle detected by the deep learning discriminator, the particle filter function unit is configured to update likelihood of the particle by the following formula, based on reliability of the rectangle detected by the deep learning discriminator being indicated by p, a distance from a rectangle center to four corners being indicated by R, a distance to the particle being indicated by r, the likelihood of the particle at the time t being indicated by $\pi_t$, and a parameter to determine a contribution rate of the deep learning discriminator being indicated by β, $$\pi_t \leftarrow \pi_t (1 + p\lambda_t)^\beta \quad \text{[Formula 1]}$$

$$\lambda_t = \max\left\{0, 1 - \frac{r^2}{R^2}\right\}. \quad \text{[Formula 2]}$$

5. The object tracking apparatus according to claim 4, wherein the particle filter function unit is configured to evaluate the particle as "having more objectness" based on the reliability p of a detection result of the deep learning discriminator being higher and a position of the particle being closer to the rectangle center.

6. The object tracking apparatus according to claim 1, further comprising a sensor unit, wherein the particle filter function unit is configured to combine sensor data from the sensor unit with the likelihood evaluation by the particle filter, in addition to the object detection result by the deep learning discriminator.

7. An object tracking method for tracking an object in video, comprising:
    detecting the object; and
    tracking the object by applying a multi-channel feature value of video including feature values to a deep learning discriminator for likelihood evaluation using a particle filter, according to a distance between position information about the multi-channel feature value and position information about each particle.

8. A non-transitory computer readable medium storing a computer program, wherein execution of the computer program causes one or more computers perform operations comprising:
    detecting an object in video; and
    tracking the object by applying a multi-channel feature value of video including feature values to a deep learning discriminator for likelihood evaluation using a particle filter, according to a distance between position information about the multi-channel feature value and position information about each particle.

9. The non-transitory computer readable medium according to claim 8, wherein the operations further comprise dynamically changing weighting of likelihood of each particle according to a state of a scene, based on the multi-channel feature value.

10. The non-transitory computer readable medium according to claim 8, wherein the operations further comprise:
    creating, for each object, a feature value histogram for the tracked object at time t by (i) extracting only particles having a label corresponding to a label of a rectangle of the object detected by the deep learning discriminator and existing in the rectangle, (ii) extracting pixel areas around the particles, and (iii) calculating feature values for the pixel areas; and
    obtaining a likelihood function for the tracked object at the time t by determining a weighted sum of a histogram at time t−1 and the histogram at the time t.

11. The non-transitory computer readable medium according to claim 10, wherein the operations further comprise, based on a certain particle existing in the rectangle detected by the deep learning discriminator, updating likelihood of the particle by the following formula, based on reliability of the rectangle detected by the deep learning discriminator being indicated by p, a distance from a rectangle center to four corners being indicated by R, a distance to the particle being indicated by r, the likelihood of the particle at the time t being indicated by $\pi_t$, and a parameter to determine a contribution rate of the deep learning discriminator being indicated by β, $$\pi_t \leftarrow \pi_t (1 + p\lambda_t)^\beta \quad \text{[Formula 1]}$$

$$\lambda_t = \max\left\{0, 1 - \frac{r^2}{R^2}\right\}. \quad \text{[Formula 2]}$$

12. The non-transitory computer readable medium according to claim 11, wherein the operations further comprise evaluating the particle as "having more objectness" based on the reliability p of a detection result of the deep learning discriminator being higher and a position of the particle being closer to the rectangle center.

13. The non-transitory computer readable medium according to claim 8, wherein the operations further comprise combining sensor data from a sensor unit with the likelihood evaluation by the particle filter, in addition to the object detection result by the deep learning discriminator.

* * * * *